(12) United States Patent
Mitarai

(10) Patent No.: US 10,821,785 B2
(45) Date of Patent: Nov. 3, 2020

(54) PNEUMATIC TIRE

(71) Applicant: SUMITOMO RUBBER INDUSTRIES, LTD., Kobe-shi, Hyogo (JP)

(72) Inventor: Yasuo Mitarai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 669 days.

(21) Appl. No.: 15/400,013

(22) Filed: Jan. 6, 2017

(65) Prior Publication Data
US 2017/0197478 A1 Jul. 13, 2017

(30) Foreign Application Priority Data
Jan. 7, 2016 (JP) .................. 2016-002057

(51) Int. Cl.
B60C 17/00 (2006.01)
B60C 15/06 (2006.01)
B60C 15/00 (2006.01)
B60C 13/02 (2006.01)
B60C 15/024 (2006.01)
B60C 15/02 (2006.01)

(52) U.S. Cl.
CPC .......... *B60C 17/0009* (2013.01); *B60C 13/02* (2013.01); *B60C 15/0045* (2013.01); *B60C 15/0054* (2013.01); *B60C 15/0242* (2013.01); *B60C 15/06* (2013.01); *B60C 15/0603* (2013.01); *B60C 15/0607* (2013.01); *B60C 2015/061* (2013.01); *B60C 2015/0621* (2013.01); *B60C 2017/0072* (2013.01)

(58) Field of Classification Search
CPC . B60C 15/00; B60C 15/0045; B60C 15/0242; B60C 17/0009; B60C 15/0603; B60C 13/02; B60C 2017/0072; B60C 2015/0621; B60C 15/06
See application file for complete search history.

(56) References Cited

U.S. PATENT DOCUMENTS 5,299,615 A * 4/1994 Ataka ................. B60C 17/0009
                                                    152/517 X
8,578,987 B2 * 11/2013 Hottebart ............ B60C 17/0018
                                                    152/516

(Continued)

FOREIGN PATENT DOCUMENTS

JP         03143710 A  *  6/1991
JP         04154411 A  *  5/1992

(Continued)

*Primary Examiner* — Adrienne C. Johnstone
(74) *Attorney, Agent, or Firm* — Birch, Stewart, Kolasch & Birch, LLP

(57) ABSTRACT

In a pneumatic tire 2 according to the present invention, in the vicinity of a bead 10 portion, a main portion 42 of a carcass ply 40 is passed through the vicinity of a neutral surface. A tensile force and a compressive force applied to the main portion 42 are small. In the tire 2, occurrence of pinch cut is suppressed. In addition, this structure alleviates a force applied to the main portion 42 even during run-flat running. In the tire 2, damage is less likely to occur even during run-flat running for a long period of time. The tire 2 has excellent run-flat durability. Furthermore, in the tire 2, an increase in the vertical stiffness constant or weight thereof is suppressed.

3 Claims, 5 Drawing Sheets

(56) References Cited

U.S. PATENT DOCUMENTS

| | | | |
|---|---|---|---|
| 8,905,101 B2 * | 12/2014 | Horiuchi | B60C 17/0009 |
| 2006/0162836 A1 * | 7/2006 | Maehara | B60C 15/024 |
| 2010/0147439 A1 | 6/2010 | Koeune et al. | |

FOREIGN PATENT DOCUMENTS

| | | | | |
|---|---|---|---|---|
| JP | 2002264615 A | * | 9/2002 | |
| JP | 2007-153276 A | | 6/2007 | |
| JP | 2007168493 A | * | 7/2007 | |
| JP | 2007296871 A | * | 11/2007 | |
| JP | 2010-137853 A | | 6/2010 | |
| JP | 2010179851 A | * | 8/2010 | |
| JP | 2012218631 A | * | 11/2012 | |
| JP | 2014201230 A | * | 10/2014 | |

\* cited by examiner

PNEUMATIC TIRE

This application claims priority on Patent Application No. 2016-002057 filed in JAPAN on Jan. 7, 2016. The entire contents of this Japanese Patent Application are hereby incorporated by reference.

BACKGROUND OF THE INVENTION

Field of the Invention

The present invention relates to pneumatic tires. Specifically, the present invention relates to run flat tires including load support layers.

Description of the Related Art

In recent years, run flat tires including load support layers inside sidewalls have been developed and widespread. Highly hard crosslinked rubber is used for the support layers. This run flat tire is called a side reinforcing type. In the side reinforcing type run flat tire, if the internal pressure is reduced due to puncture, a load is supported by the support layers. The support layers suppress flexure of the tire in a punctured state. This run flat tire allows for running for some distance even in the punctured state. Running in the punctured state is referred to as run-flat running.

During run-flat running, when the tire moves over a projection on a road surface or when the tire falls into a pothole, each bead portion of the tire greatly deforms in some cases. Normally, a carcass ply is turned up around each bead from the inner side toward the outer side in the axial direction. Due to deformation of the bead portion, breakage of cords included in the carcass ply may occur. Damage occurring with the breakage of the cords is referred to as pinch cut. Run flat tires are desired in which pinch cut does not occur even during run-flat running.

During run-flat running, each bead portion repeats deformation and restoration. This causes heat generation in the bead portion. When run-flat running is performed for a long period of time, damage of the bead portion may occur due to the heat generation and the deformation. Run flat tires are desired to have high run-flat durability such that damage of each bead portion does not occur even during run-flat running for a long period of time.

JP2007-153276 discloses a run flat tire in which a reinforcing layer including cords is inserted around each bead portion in order to suppress occurrence of pinch cut. In addition, a method in which the stiffness of a carcass is enhanced by configuring the carcass with two carcass plies in order to suppress occurrence of pinch cut has also been known.

JP2010-137853 (US2010/0147439) discloses a tire including inserts (load support layers) each configured to have a two-layer structure with a hard rubber and a flexible rubber in order to achieve high run-flat durability and favorable ride comfort during normal running.

Further improvement of pinch cut resistance and run-flat durability with favorable ride comfort during normal running being maintained is desired. With the method in which the number of carcass plies is increased or with the method in which a reinforcing layer is inserted, the vertical stiffness constant of each side portion of a tire increases, so that there is a possibility that ride comfort during normal running deteriorates. With these methods, there is a possibility that the rolling resistance increases due to an increase in the weight of a tire. In addition, as to the tire disclosed in JP2010-137853, improvement of pinch cut resistance thereof is not mentioned.

An object of the present invention is to provide a pneumatic tire having improved pinch cut resistance and run-flat durability with favorable ride comfort during normal running being maintained.

SUMMARY OF THE INVENTION

A pneumatic tire according to the present invention includes: a pair of beads each located in a side portion; a carcass extending on and between the one bead and the other bead; and a pair of load support layers each located in the side portion and inward of the carcass in an axial direction. Each bead includes a core and an apex extending from the core outward in a radial direction. The carcass includes a carcass ply. The carcass ply is turned up around the core from an inner side toward an outer side in the axial direction. Because of this turning-up, a main portion and turned-up portions are formed in the carcass ply.

When: a point that is located on an outer surface of the side portion and at which a distance from an outer edge of the core in the radial direction is 0.7 times of a distance from the outer edge of the core to an end of the apex is denoted as a point Po; a line that is drawn from the point Po to an inner surface of the side portion and is normal to the inner surface of the side portion is denoted by Lo; a point that is located on the outer surface of the side portion and at which the distance from the outer edge of the core in the radial direction is 0.3 times of the distance from the outer edge of the core to the end of the apex is denoted as a point Pi; a line that is drawn from the point Pi to the inner surface of the side portion and is normal to the inner surface of the side portion is denoted by Li; a point on the normal line Lo at which point a distance from the point Po is 35% of a length Do of the normal line Lo is denoted by $Po_{35}$; a point on the normal line Lo at which point the distance from the point Po is 65% of the length Do is denoted by $Po_{65}$; a point on the normal line Li at which point a distance from the point Pi is 35% of a length Di of the normal line Li is denoted by $Pi_{35}$; and a point on the normal line Li at which point the distance from the point Pi is 65% of the length Di is denoted by $Pi_{65}$, the main portion passes through a region surrounded by the point $Po_{35}$, the point $Po_{65}$, the point $Pi_{35}$, and the point $Pi_{65}$.

As described above, when the tire moves over a projection on a road surface or when the tire falls into a pothole, a bead portion of each side portion is pressed against a flange of a rim and greatly deformed. A portion on which both a compressive force and a tensile force do not act even during deformation of the bead portion is present between the outer surface and the inner surface of the bead portion. This portion is referred to as a neutral surface. In the pneumatic tire according to the present invention, in the vicinity of the bead portion, the main portion of the carcass ply is passed through the vicinity of the neutral surface. A tensile force and a compressive force applied to the main portion are small. In the tire, occurrence of pinch cut is suppressed. In addition, this structure alleviates a force applied to the main portion even during run-flat running. In the tire, damage is less likely to occur even during run-flat running for a long period of time. The tire has excellent run-flat durability. Furthermore, in the tire, the number of carcasses is not increased, and a reinforcing layer is not added. In the tire, an increase in the vertical stiffness constant or weight thereof is suppressed. In the tire, favorable ride comfort during normal running and low rolling resistance are maintained.

Preferably, when: a point on the normal line Lo at which point the distance from the point Po is 40% of the length Do is denoted by $Po_{40}$; a point on the normal line Lo at which point the distance from the point Po is 60% of the length Do is denoted by $Po_{60}$; a point on the normal line Li at which point the distance from the point Pi is 40% of the length Di is denoted by $Pi_{40}$; and a point on the normal line Li at which point the distance from the point Pi is 60% of the length Di is denoted by $Pi_{60}$, the main portion passes through a region surrounded by the point $Po_{40}$, the point $Po_{60}$, the point $Pi_{40}$, and the point $Pi_{60}$.

Preferably, the apex includes a first layer that is in contact with a radially outer surface of the core, and a second layer that is located outward of the first layer in the axial direction. Each turned-up portion is passed between the first layer and the second layer.

Preferably, when a radially outer edge of a contact surface between the side portion and a rim R is defined as a separation point PB, a ratio (TS/TI) of a thickness TS of the side portion at the separation point PB relative to a maximum thickness TI of the load support layer is equal to or greater than 1.5 and equal to or less than 2.0.

Preferably, the side portion has a large number of dimples or projections on an outer surface thereof.

Preferably, when a region in which the dimples or projections are arranged in the side portion is denoted by S, a width, in the radial direction, of the region S is denoted by DW, and a height from a bead base line to the end of the apex is denoted by BH, a central position of the region S coincides with a position of the end of the apex in the radial direction, and a ratio (DW/BH) of the width DW relative to the height BH is equal to or greater than 0.3 and equal to or less than 0.6.

DESCRIPTION OF THE PREFERRED EMBODIMENTS

The following will describe in detail the present invention based on preferred embodiments with appropriate reference to the drawings.

Figure 1:
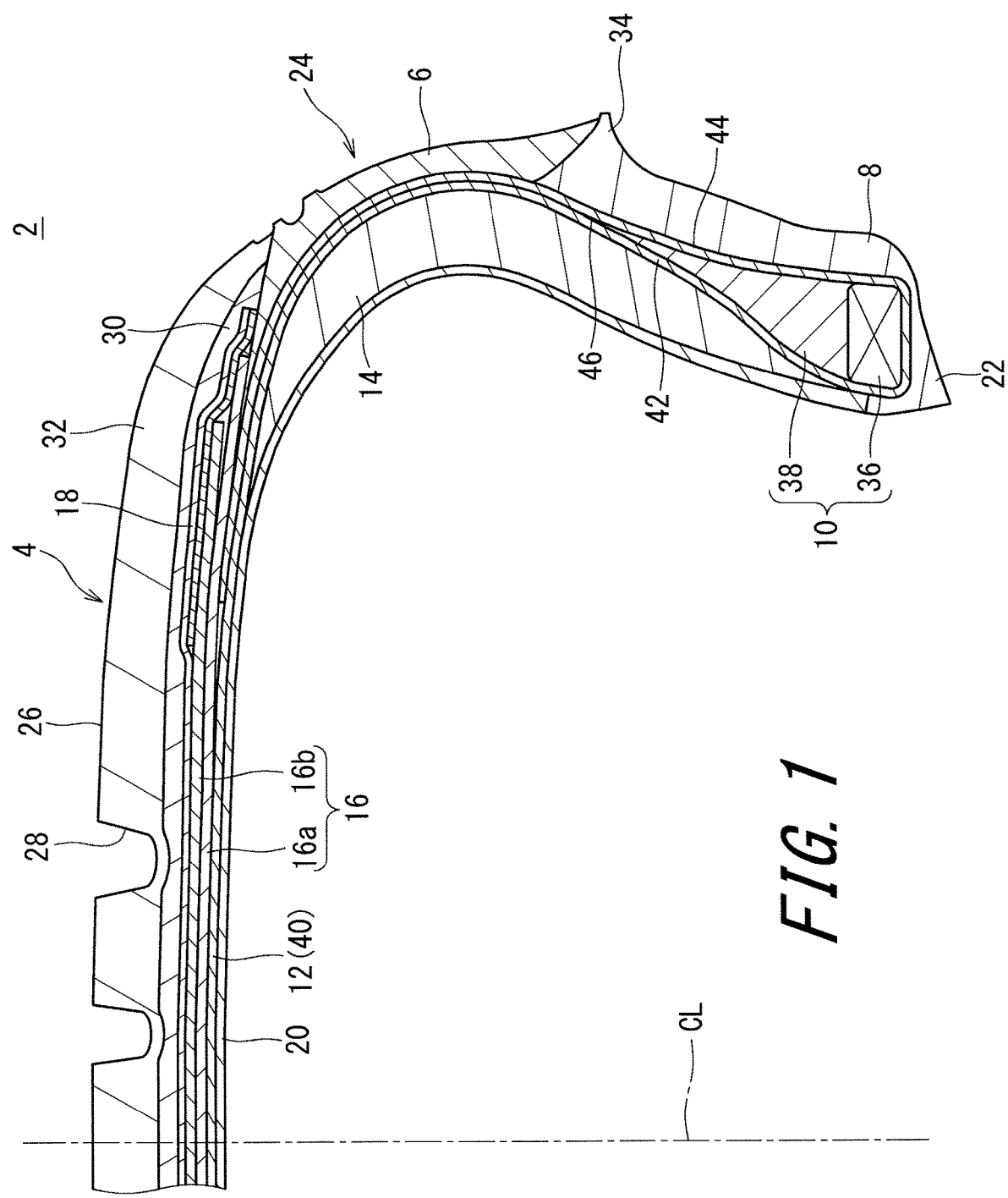
FIG. 1 is a cross-sectional view of a portion of a tire according to an embodiment of the present invention.

FIG. 1 shows a pneumatic tire 2 according to an embodiment of the present invention. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about the equator plane except for a tread pattern.

The tire 2 includes a tread 4, a pair of sidewalls 6, a pair of clinches 8, a pair of beads 10, a carcass 12, a pair of load support layers 14, a belt 16, a band 18, an inner liner 20, and a pair of chafers 22. A portion of the tire 2 which portion extends from the vicinity of each edge of the tread 4 inward in the radial direction is referred to as a side portion 24. Each sidewall 6, each clinch 8, each bead 10, each load support layer 14, and each chafer 22 are located in the side portion 24. The tire 2 is of a tubeless type. The tire 2 is mounted to a passenger car.

The tread 4 has a shape projecting outward in the radial direction. The tread 4 forms a tread surface 26 that is brought into contact with a road surface. Grooves 28 are formed on the tread surface 26. The tread pattern is formed by the grooves 28. The tread 4 includes a base layer 30 and a cap layer 32. The cap layer 32 is located outward of the base layer 30 in the radial direction. The cap layer 32 is laminated on the base layer 30. The base layer 30 is formed from a crosslinked rubber that is excellent in adhesiveness. A typical base rubber of the base layer 30 is a natural rubber. The cap layer 32 is formed from a crosslinked rubber that is excellent in wear resistance, heat resistance, and grip performance.

Each sidewall 6 extends from the edge of the tread 4 substantially inward in the radial direction. The radially outer edge of the sidewall 6 is joined to the tread 4. The radially inner edge of the sidewall 6 is joined to the clinch 8. The sidewall 6 is formed from a crosslinked rubber that is excellent in cut resistance and weather resistance. The sidewall 6 is located outward of the carcass 12 in the axial direction. The sidewall 6 prevents the carcass 12 from being damaged.

In light of prevention of damage, a hardness of each sidewall 6 is preferably equal to or greater than 50 and more preferably equal to or greater than 55. In light of ride comfort in a normal state, the hardness is preferably equal to or less than 70 and more preferably equal to or less than 65.

In the present embodiment, the hardness is measured according to the standard of "JIS K6253" with a type A durometer. The hardness is measured by pressing the durometer against the cross section shown in FIG. 1. The measurement is performed at 23° C. Hardnesses of each clinch 8, each apex, and each load support layer 14 described later are measured in the same manner.

Each clinch 8 is located substantially inward of the sidewall 6 in the radial direction. The clinch 8 is located outward of the bead 10 and the carcass 12 in the axial direction. The clinch 8 is formed from a crosslinked rubber that is excellent in wear resistance. The clinch 8 comes into contact with a flange of a rim, which is not shown.

In light of wear resistance, the hardness of the clinch 8 is preferably equal to or greater than 60 and more preferably equal to or greater than 65. In light of ride comfort in a normal state, the hardness is preferably equal to or less than 90 and more preferably equal to or less than 80.

A rim protector 34 is formed near the boundary between the sidewall 6 and the clinch 8 so as to project outward in the axial direction in a tapered shape. When the tire 2 is mounted onto the rim, the end surface of the rim protector 34 is located outward of the edge of the flange of the rim in the axial direction, which is not shown. The rim protector 34 projects from the edge of the flange in the axial direction. When the vehicle is moved close to a road shoulder, the rim protector 34 comes into contact with a curb. Thus, contact between the rim flange and the curb is avoided. The rim protector 34 prevents damage of the flange.

Each bead 10 is located inward of the sidewall 6 in the radial direction. The bead 10 is located inward of the clinch 8 in the axial direction. The bead 10 includes a core 36 and an apex 38 extending from the core 36 outward in the radial direction. The core 36 has a ring shape and includes a non-stretchable wound wire. A typical material of the wire is steel. The apex 38 is tapered outward in the radial direction. The apex 38 is formed from a highly hard cross-linked rubber.

From the standpoint that a bead 10 portion has appropriate stiffness, the hardness of the apex 38 is preferably equal to or greater than 60 and more preferably equal to or greater than 65. In light of ride comfort during normal running, the hardness is preferably equal to or less than 90 and more preferably equal to or less than 80.

The carcass 12 includes a carcass ply 40. The carcass ply 40 extends on and between the beads 10 at both sides. The carcass ply 40 extends along the tread 4 and each sidewall 6. The carcass ply 40 is turned up around each core 36 from the inner side toward the outer side in the axial direction. Because of this turning-up, a main portion 42 and turned-up portions 44 are formed in the carcass ply 40. The edge of each turned-up portion 44 reaches a position directly below the belt 16. In other words, each turned-up portion 44 overlaps the belt 16. The carcass 12 has a so-called "ultra-highly turned-up structure". The carcass 12 having the ultra-highly turned-up structure contributes to the durability of the tire 2 in a punctured state.

As shown in FIG. 1, the main portion 42 is located inward of the apex 38 in the axial direction. The turned-up portion 44 is located outward of the apex 38 in the axial direction. In other words, the apex 38 is located between the main portion 42 and the turned-up portion 44 of the carcass ply 40.

The carcass ply 40 includes a large number of cords aligned with each other, and a topping rubber, which are not shown. The absolute value of the angle of each cord relative to the equator plane is 75° to 90°. In other words, the carcass 12 has a radial structure. The cords are formed from an organic fiber. Examples of preferable organic fibers include polyethylene terephthalate fibers, nylon fibers, rayon fibers, polyethylene naphthalate fibers, and aramid fibers.

Each load support layer 14 is located inward of the sidewall 6 in the axial direction. The load support layer 14 is located inward of the carcass 12 in the axial direction. The load support layer 14 is located outward of the inner liner 20 in the axial direction. The load support layer 14 is interposed between the carcass 12 and the inner liner 20. The load support layer 14 is tapered inward in the radial direction and also tapered outward in the radial direction. The load support layer 14 has a crescent-like shape. In the radial direction, the inner edge of the load support layer 14 is located inward of an end 46 of the apex 38. In other words, the load support layer 14 overlaps the apex 38. The radially outer edge of the load support layer 14 is located inward of the edge of the belt 16 in the axial direction. In other words, the load support layer 14 overlaps the belt 16.

The load support layer 14 is formed from a highly hard crosslinked rubber. When the tire 2 is punctured, the load support layer 14 supports a load. The load support layer 14 allows for running for some distance with the tire 2 even in a punctured state. The tire 2 is also referred to as a run flat tire 2. The tire 2 is of a side reinforcing type. The tire 2 may include load support layers 14 each having a shape different from the shape of the load support layer 14 shown in FIG. 1.

From the standpoint that a load can be supported during run-flat running, the hardness of the load support layer 14 is preferably equal to or greater than 60 and more preferably equal to or greater than 65. In light of ride comfort in a normal state, the hardness is preferably equal to or less than 90 and more preferably equal to or less than 80.

The belt 16 is located inward of the tread 4 in the radial direction. The belt 16 is laminated on the carcass 12. The belt 16 reinforces the carcass 12. The belt 16 includes an inner layer 16a and an outer layer 16b. As is obvious from FIG. 1, the width of the inner layer 16a is slightly larger than the width of the outer layer 16b. Each of the inner layer 16a and the outer layer 16b includes a large number of cords aligned with each other, and a topping rubber, which are not shown. Each cord is tilted relative to the equator plane. The absolute value of the tilt angle is normally equal to or greater than 10° and equal to or less than 35°. The direction in which each cord of the inner layer 16a is tilted relative to the equator plane is opposite to the direction in which each cord of the outer layer 16b is tilted relative to the equator plane. The material of the cords is preferably steel. An organic fiber may be used for the cords. The belt 16 may include three or more layers.

The band 18 is located outward of the belt 16 in the radial direction. The width of the band 18 is substantially equal to the width of the belt 16 in the axial direction. The band 18 includes a cord and a topping rubber, which are not shown. The cord is helically wound. The band 18 has a so-called jointless structure. The cord extends substantially in the circumferential direction. The angle of the cord relative to the circumferential direction is equal to or less than 5° and further equal to or less than 2°. The belt 16 is held by the cord, so that lifting of the belt 16 is suppressed. The cord is formed from an organic fiber. Examples of preferable organic fibers include nylon fibers, polyester fibers, rayon fibers, polyethylene naphthalate fibers, and aramid fibers.

The belt 16 and the band 18 form a reinforcing layer. The reinforcing layer may be composed of only the belt 16. The reinforcing layer may be composed of only the band 18.

The inner liner 20 is joined to the inner surfaces of the carcass 12 and each load support layer 14. The inner liner 20 is formed from a crosslinked rubber. For the inner liner 20, a rubber that is excellent in air blocking property is used. The inner liner 20 maintains the internal pressure of the tire 2.

Each chafer 22 is located in the vicinity of the bead 10. When the tire 2 is mounted onto the rim, the chafer 22 comes into contact with the rim. Because of this contact, the vicinity of the bead 10 is protected. In this embodiment, the chafer 22 is integrated with the clinch 8. The material of the chafer 22 is the same as the material of the clinch 8. The chafer 22 may include a fabric and a rubber with which the fabric is impregnated.

Figure 2:
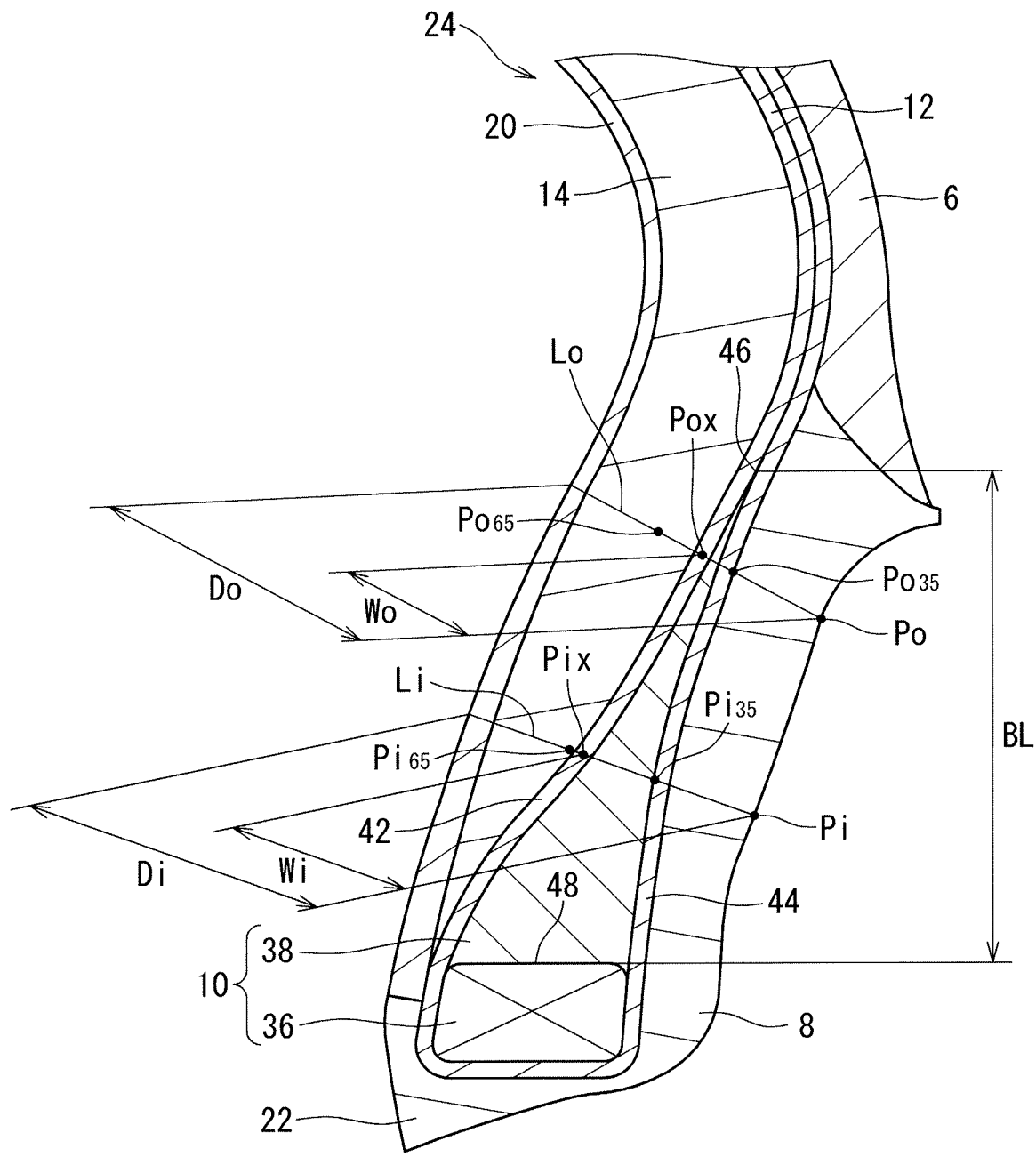
FIG. 2 is an enlarged cross-sectional view of a portion of the tire in FIG. 1.

FIG. 2 is an enlarged view of the bead 10 portion of the tire 2 in FIG. 1. In FIG. 2, the up-down direction is the radial direction, the right-left direction is the axial direction, and the direction perpendicular to the surface of the sheet is the circumferential direction. In FIG. 2, a double-headed arrow BL indicates the distance from an outer edge 48 of the core 36 to the end 46 of the apex 38 in the radial direction.

In FIG. 2, a point Po is a point on the outer surface of the side portion 24 at which point the distance in the radial direction from the outer edge 48 of the core 36 is 0.7 times of the distance BL. A straight line Lo is a line that is drawn from the point Po to the inner surface of the side portion 24 and is normal to the inner surface of the side portion 24. A double-headed arrow Do indicates the length of the normal line Lo. This length is the thickness of the side portion 24 at the point Po. A point $Po_{35}$ is a point on the normal line Lo at which point the distance from the point Po is 35% of the length Do. A point $Po_{65}$ is a point on the normal line Lo at which point the distance from the point Po is 65% of the length Do.

In FIG. 2, a point Pi is a point on the outer surface of the side portion 24 at which point the distance in the radial direction from the outer edge 48 of the core 36 is 0.3 times of the distance BL. A straight line Li is a line that is drawn from the point Pi to the inner surface of the side portion 24 and is normal to the inner surface of the side portion 24. A double-headed arrow Di indicates the length of the normal line Li. This length is the thickness of the side portion 24 at the point Pi. A point $Pi_{35}$ is a point on the normal line Li at which point the distance from the point Pi is 35% of the length Di. A point $Pi_{65}$ is a point on the normal line Li at which point the distance from the point Pi is 65% of the length Di.

In the tire 2, the main portion 42 of the carcass ply 40 intersects the normal line Lo and the normal line Li. The main portion 42 passes through a region surrounded by the point $Po_{35}$, the point $Po_{65}$, the point $Pi_{35}$, and the point $Pi_{65}$. In this specification, the region surrounded by the point $Po_{35}$, the point $Po_{65}$, the point $Pi_{35}$, and the point $Pi_{65}$ is referred to as a 30%-width neutral surface region. Here, the main portion 42 passing through the 30%-width neutral surface region means that a center line of the main portion 42 is included within the 30%-width neutral surface region in the area between the normal line Lo and the normal line Li.

In FIG. 2, a point Pox is the point of intersection between the center line of the main portion 42 and the normal line Lo. The center line of the main portion 42 is a line that passes through the center of the main portion 42 in the width direction thereof and extends in the direction in which the main portion 42 extends. A double-headed arrow Wo indicates the length from the point Po to the point Pox. Since the main portion 42 passes through the 30%-width neutral surface region, the ratio (Wo/Do) of the length Wo relative to the length Do is equal to or greater than 0.35 and equal to or less than 0.65.

In FIG. 2, a point Pix is the point of intersection between the center line of the main portion 42 and the normal line Li. A double-headed arrow Wi indicates the length from the point Pi to the point Pix. Since the main portion 42 passes through the 30%-width neutral surface region, the ratio (Wi/Di) of the length Wi relative to the length Di is equal to or greater than 0.35 and equal to or less than 0.65.

The following will describe advantageous effects of the present invention.

Figure 3:
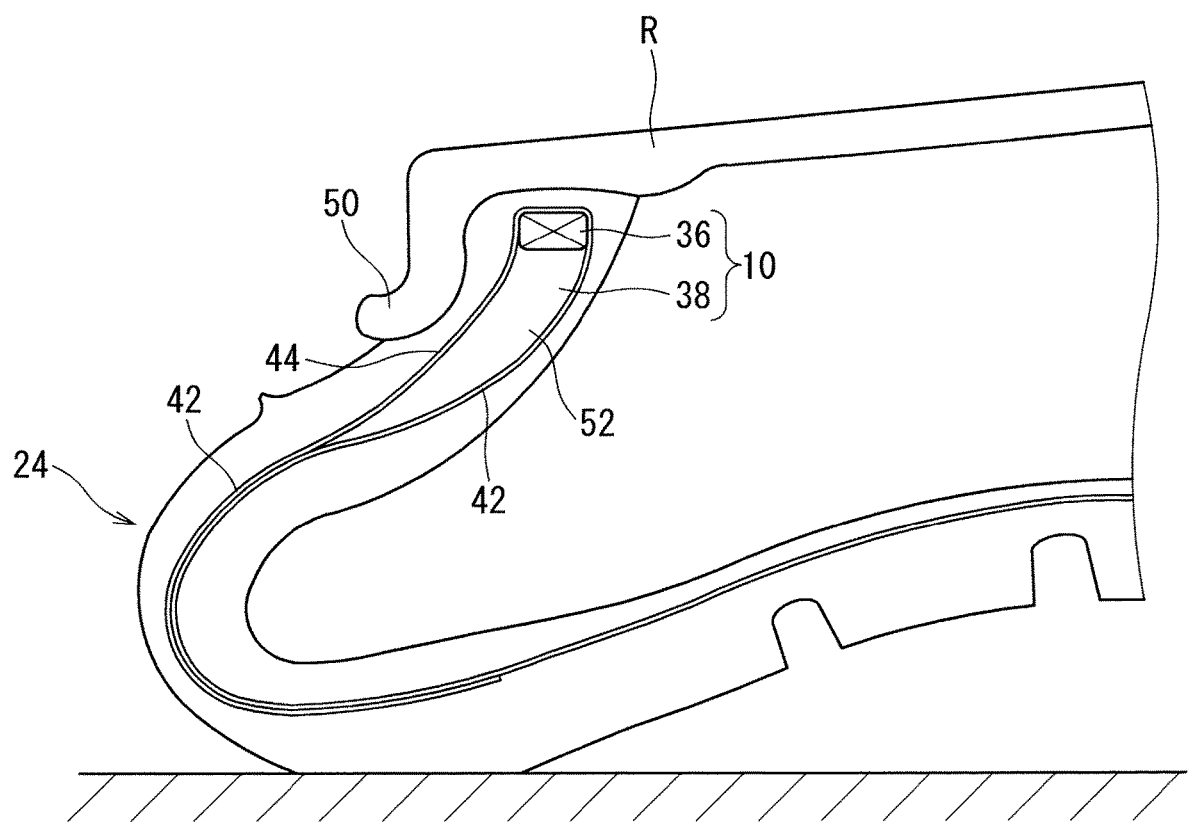
FIG. 3 is a schematic diagram of the tire in a run-flat running state.

FIG. 3 is a schematic diagram showing a state of the tire 2 during run-flat running. The tire 2 is mounted on a rim R. When the tire 2 moves over a projection on a road surface or when the tire 2 falls into a pothole, the bead 10 portion of the side portion 24 is pressed against a flange 50 of the rim R. Accordingly, the vicinity of the bead 10 greatly deforms into a round shape projecting inward in the axial direction. This deformation becomes great particularly in a vicinity 52 of the center, in the radial direction, of the apex 38. Because of this deformation, a load is applied to the carcass ply 40. In an existing tire, pinch cut may occur due to such deformation.

Because of the deformation of the bead 10 portion, a great compressive force acts on a portion, close to the rim R, of the bead 10 portion. That is, a great compressive force acts on the vicinity of the outer surface of the bead 10 portion. A great tensile force acts on a portion, opposite to the rim R, of the bead 10 portion. That is, a great tensile force acts on the vicinity of the inner surface of the bead 10 portion. In the vicinity of an intermediate portion between the inner surface and the outer surface of the bead 10 portion, a portion on which both a compressive force and a tensile force do not act is present. This portion is referred to as a neutral surface. In the vicinity of the neutral surface, a compressive force or tensile force applied during deformation of the bead 10 is small.

In the tire 2, the main portion 42 passes through the 30%-width neutral surface region. In the vicinity 52 of the center, in the radial direction, of the apex 38 whose deformation is great, the main portion 42 passes through the vicinity of the center between the outer surface and the inner surface of the bead 10 portion. The main portion 42 passes through the vicinity of the neutral surface. Even when the bead 10 portion greatly deforms, a compressive force or tensile force applied to the main portion 42 is small. Occurrence of pinch cut in the main portion 42 is prevented. The tire 2 has excellent pinch cut resistance. Furthermore, since the compressive force or tensile force applied to the main portion 42 is reduced, separation of the cords of the main portion 42 from the rubber is suppressed even during run-flat running for a long period of time. The tire 2 has excellent run-flat durability.

As described above, in the tire 2, the pinch cut resistance and the run-flat durability are improved by appropriately adjusting the position of the main portion 42 of the carcass ply 40. The number of carcass plies 40 is not increased, and a reinforcing layer is not inserted. In the tire 2, an increase in the vertical stiffness constant thereof and an increase in the weight thereof are suppressed. In the tire 2, favorable ride comfort and low rolling resistance are maintained. Although not shown in this embodiment, since the run-flat durability is improved in the bead 10 portion, favorable run-flat durability can be achieved even when the thickness of each load support layer 14 is decreased. Accordingly, the vertical stiffness constant and the weight can be reduced. Therefore, improvement of the ride comfort and reduction of the rolling resistance can be achieved.

Although not shown, a point $Po_{40}$ is a point on the normal line Lo at which point the distance from the point Po is 40% of the length Do. A point $Po_{60}$ is a point on the normal line Lo at which point the distance from the point Po is 60% of the length Do. A point $Pi_{40}$ is a point on the normal line Li at which point the distance from the point Pi is 40% of the length Di. A point $Pi_{60}$ is a point on the normal line Li at which point the distance from the point Pi is 60% of the length Di.

In the tire 2, the main portion 42 preferably passes through a region surrounded by the point $Po_{40}$, the point $Po_{60}$, the point $Pi_{40}$, and the point $Pi_{60}$. In this specification, the region surrounded by the point $Po_{40}$, the point $Po_{60}$, the point $Pi_{40}$, and the point $Pi_{60}$ is referred to as a 20%-width neutral surface region. Since the main portion 42 passes through the 20%-width neutral surface region, the compressive force or tensile force applied to the main portion 42 are reduced more effectively. Occurrence of pinch cut in the main portion 42 is prevented. Even during run-flat running for a long period of time, the main portion 42 is less likely to be damaged. The tire 2 has excellent run-flat durability.

In the tire 2, the dimensions and angles of each component of the tire 2 are measured in a state where the tire 2 is mounted on a normal rim R and inflated to a normal internal pressure, unless otherwise specified. During the measurement, no load is applied to the tire 2. In the present specification, the normal rim R means a rim R specified in a standard on which the tire 2 is based. The "standard rim R" in the JATMA standard, the "Design Rim" in the TRA standard, and the "Measuring Rim" in the ETRTO standard are normal rims R. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 2 is designed for a passenger car, the dimensions and angles are measured in a state where the internal pressure is 180 kPa. The same applies to a tire described below.

Figure 4:
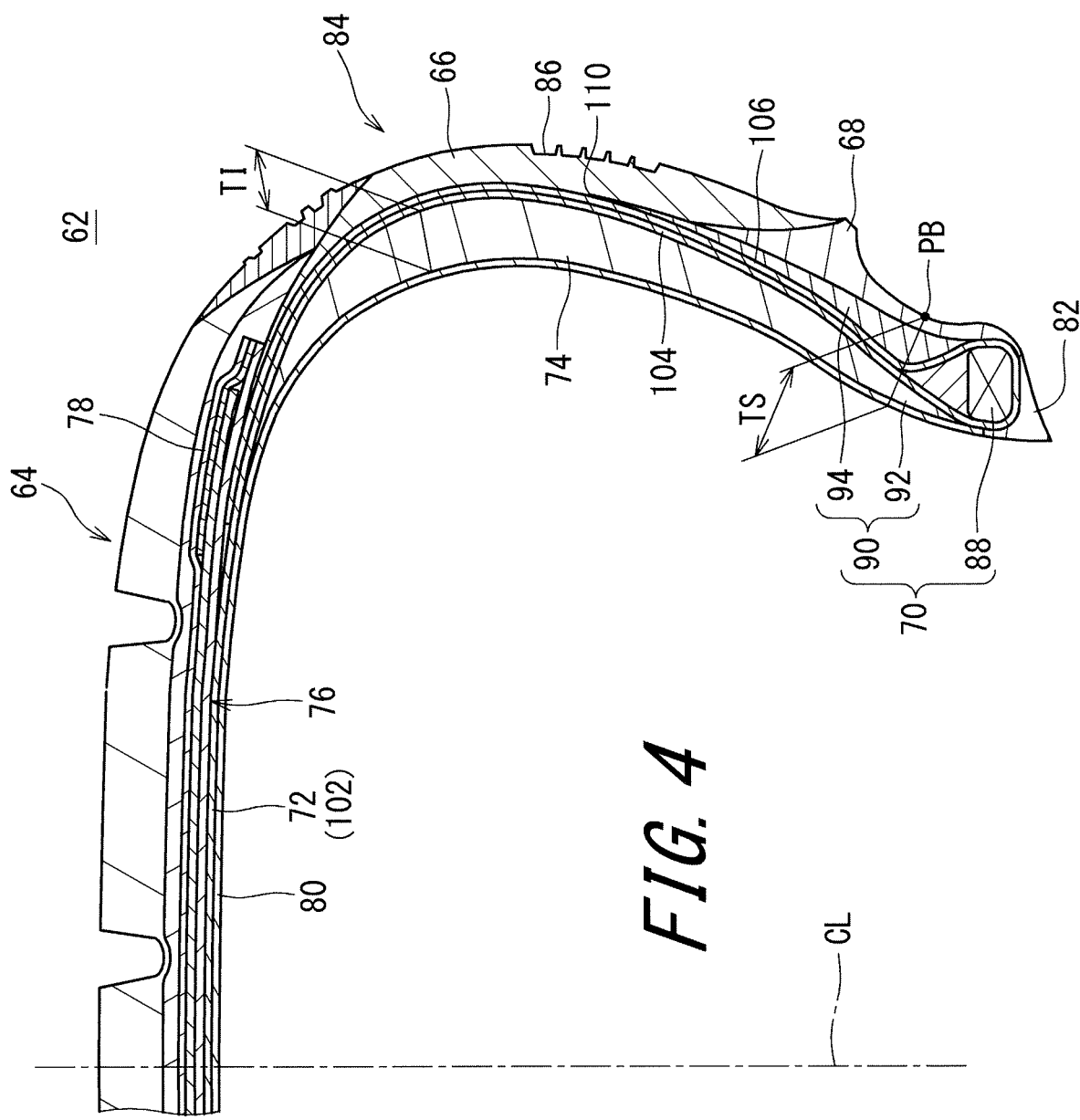
FIG. 4 is a cross-sectional view of a portion of a tire according to another embodiment of the present invention.

FIG. 4 shows a pneumatic tire 62 according to another embodiment of the present invention. In FIG. 4, the up-down direction is the radial direction of the tire 62, the right-left direction is the axial direction of the tire 62, and the direction perpendicular to the surface of the sheet is the circumferential direction of the tire 62. In FIG. 4, an alternate long and short dash line CL represents the equator plane of the tire 62. The shape of the tire 62 is symmetrical about the equator plane except for a tread pattern.

The tire 62 includes a tread 64, a pair of sidewalls 66, a pair of clinches 68, a pair of beads 70, a carcass 72, a pair of load support layers 74, a belt 76, a band 78, an inner liner 80, and a pair of chafers 82. A portion of the tire 62 which portion extends from the vicinity of each edge of the tread 64 inward in the radial direction is referred to as a side portion 84. Each sidewall 66, each clinch 68, each bead 70, each load support layer 74, and each chafer 82 are located in the side portion 84. The tire 62 is of a tubeless type. The tire 62 is mounted to a passenger car.

In the tire 62, the tread 64, each clinch 68, the belt 76, the band 78, the inner liner 80, and each chafer 82 have the same structures as those of the tire 2 in FIG. 1. The shapes of these components are partially different from those of tire 2 in FIG. 1, but the differences do not influence the contents of the present invention. The following will describe each sidewall 66, each bead 70, the carcass 72, and each load support layer 74 of the tire 62 in FIG. 4.

Each sidewall 66 extends from the edge of the tread 64 substantially inward in the radial direction. The radially outer edge of the sidewall 66 is joined to the tread 64. The radially inner edge of the sidewall 66 is joined to the clinch 68. The sidewall 66 has a large number of dimples 86 on the surface thereof.

Each sidewall 66 may not have dimples 86. Dimples 86 may be provided on the outer surface of the side portion 84 other than the sidewall 66. In addition, each sidewall 66 may have a large number of projections. Projections may be provided on the outer surface of the side portion 84 other than the sidewall 66.

Each bead 70 includes a core 88 and an apex 90. The core 88 has a ring shape and includes a non-stretchable wound wire. A typical material of the wire is steel.

As shown in FIG. 4, the apex 90 includes a first layer 92 and a second layer 94. The apex 90 is composed of the first layer 92 and the second layer 94. The first layer 92 extends from the core 88 outward in the radial direction. The first layer 92 is tapered outward in the radial direction. The first layer 92 is formed from a highly hard crosslinked rubber.

The second layer 94 is located outward of the first layer 92 in the axial direction. The second layer 94 is located inward of the clinch 68 in the axial direction. The second layer 94 is tapered inward in the radial direction and also tapered outward in the radial direction. In the radial direction, an outer edge 96 of the second layer 94 is located outward of an outer edge 98 of the first layer 92. In the radial direction, the outer edge 96 of the second layer 94 is located outward of an outer edge of the clinch 68. The outer edge 96 of the second layer 94 is covered with the sidewall 66. In the radial direction, the inner edge of the second layer 94 is located outward of the inner edge of the clinch 68. The inner edge of the second layer 94 is covered with the clinch 68. The outer edge 96 of the second layer 94 may be located inward of the outer edge 100 of the clinch 68. In this case, the outer edge 96 of the second layer 94 is covered with the clinch 68.

In this embodiment, the crosslinked rubber of the second layer 94 is the same as the crosslinked rubber of the first layer 92. The second layer 94 may be formed from a crosslinked rubber different from the crosslinked rubber of the first layer 92.

From the standpoint that a bead 70 portion has appropriate stiffness, a hardness of the first layer 92 and the second layer 94 is preferably equal to or greater than 60 and more preferably equal to or greater than 65. In light of ride comfort in a normal state, the hardness is preferably equal to or less than 90 and more preferably equal to or less than 80.

The carcass 72 includes a carcass ply 102. The carcass ply 102 extends on and between the beads 70 at both sides. The carcass ply 102 extends along the tread 64 and each sidewall 66. The carcass ply 102 is turned up around each core 88 from the inner side toward the outer side in the axial direction. Because of this turning-up, a main portion 104 and turned-up portions 106 are formed in the carcass ply 102. The edge of each turned-up portion 106 reaches a position directly below the belt 76. In other words, each turned-up portion 106 overlaps the belt 76. The carcass 72 has a so-called "ultra-highly turned-up structure". The carcass 72 having the ultra-highly turned-up structure contributes to the durability of the tire 62 in a punctured state.

Figure 5:
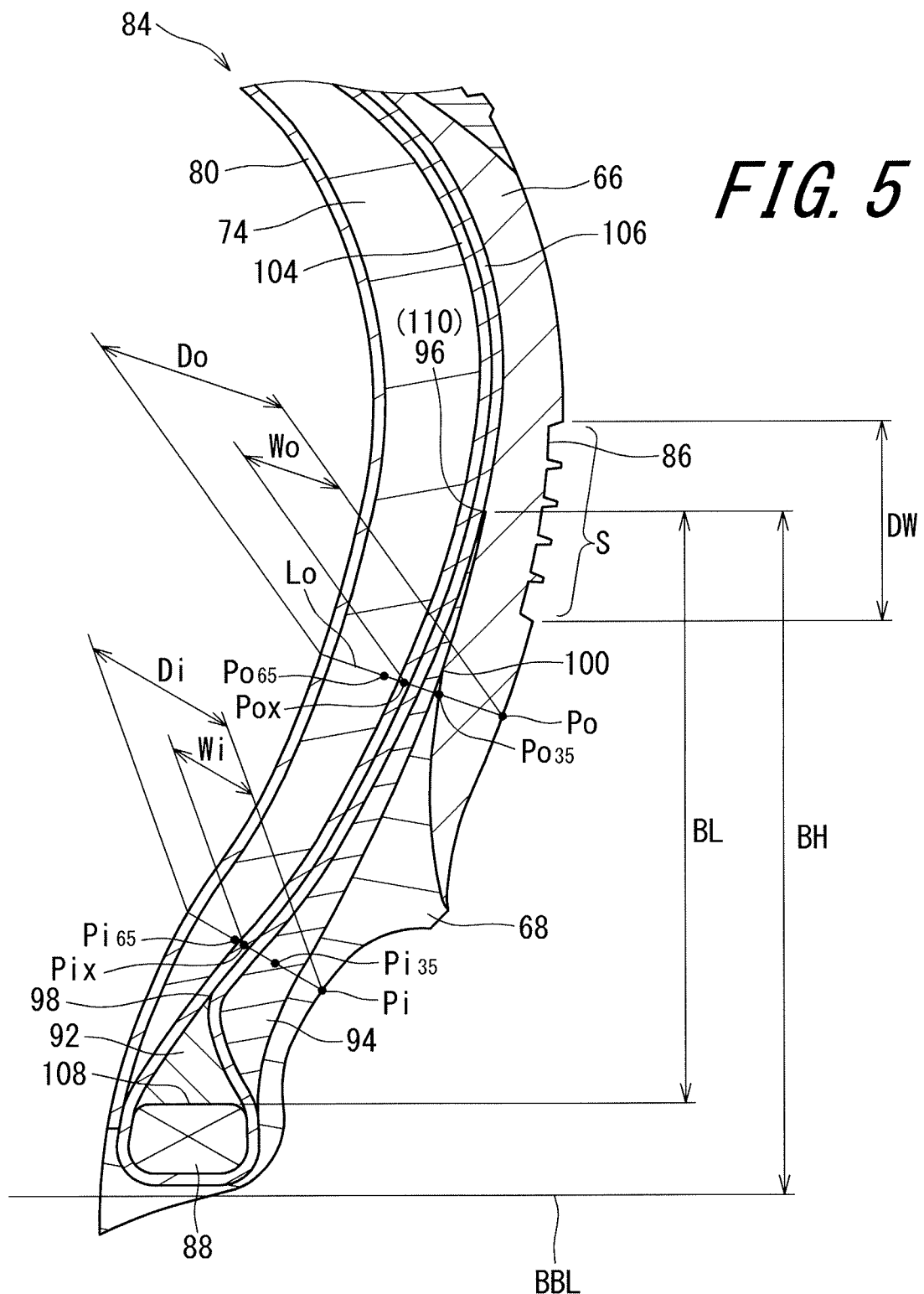
FIG. 5 is an enlarged cross-sectional view of a portion of the tire in FIG. 4.

FIG. 5 shows the bead 70 portion of the tire 62 in FIG. 4. In FIG. 5, the up-down direction is the radial direction of the tire 62, the right-left direction is the axial direction of the tire 62, and the direction perpendicular to the surface of the sheet is the circumferential direction of the tire 62. As shown in FIG. 5, the main portion 104 is passed through the axially inner side of the first layer 92 and the second layer 94. The turned-up portion 106 is passed between the first layer 92 and the second layer 94. The size of the first layer 92 is smaller than the size of a conventional apex composed of a single layer. At the axially inner side of the second layer 94, the turned-up portion 106 is curved toward the inner side. In the tire 62, the turned-up portion 106 is passed through a position close to the inner surface of the side portion 84, as compared to a conventional tire having the apex composed of the single layer.

Each load support layer 74 is located inward of the sidewall 66 in the axial direction. The load support layer 74 is located inward of the carcass 72 in the axial direction. The load support layer 74 is located outward of the inner liner 80 in the axial direction. The load support layer 74 is interposed between the carcass 72 and the inner liner 80. The load support layer 74 is tapered inward in the radial direction and also tapered outward in the radial direction. The load support layer 74 has a crescent-like shape. The inner edge of the load support layer 74 is located inward of the outer edge of the second layer 94. In other words, the load support layer 74 overlaps the second layer 94. The radially outer edge of the load support layer 74 is located inward of the edge of the belt 76 in the axial direction. In other words, the load support layer 74 overlaps the belt 76.

In FIG. 5, a double-headed arrow BL indicates the distance from an outer edge 108 of the core 88 to an end 110 of the apex 90 in the radial direction. This distance is the distance from the outer edge 108 of the core 88 to the outer edge 96 of the second layer 94.

In FIG. 5, a point Po is a point on the outer surface of the side portion 84 at which point the distance in the radial direction from the outer edge of the core 88 is 0.7 times of the distance BL. A straight line Lo is a line that is drawn from the point Po to the inner surface of the side portion 84 and is normal to the inner surface of the side portion 84. A double-headed arrow Do indicates the length of the normal line Lo. This length is the thickness of the side portion 84 at the point Po. A point $Po_{35}$ is a point on the normal line Lo at which point the distance from the point Po is 35% of the length Do. A point $Po_{65}$ is a point on the normal line Lo at which point the distance from the point Po is 65% of the length Do.

In FIG. 5, a point Pi is a point on the outer surface of the side portion 84 at which point the distance in the radial direction from the outer edge of the core 88 is 0.3 times of the distance BL. A straight line Li is a line that is drawn from the point Pi to the inner surface of the side portion 84 and is normal to the inner surface of the side portion 84. A double-headed arrow Di indicates the length of the normal line Li. This length is the thickness of the side portion 84 at the point Pi. A point $Pi_{35}$ is a point on the normal line Li at which point the distance from the point Pi is 35% of the length Di. A point $Pi_{65}$ is a point on the normal line Li at which point the distance from the point Pi is 65% of the length Di.

In the tire 62, the main portion 104 of the carcass ply 102 intersects the normal line Lo and the normal line Li. At this time, the main portion 104 passes through a region surrounded by the point $Po_{35}$, the point $Po_{65}$, the point $Pi_{35}$, and the point $Pi_{65}$. In this specification, the region surrounded by the point $Po_{35}$, the point $Po_{65}$, the point $Pi_{35}$, and the point $Pi_{65}$ is referred to as a 30%-width neutral surface region. Here, the main portion 104 passing through the 30%-width neutral surface region means that a center line of the main portion 104 is included within the 30%-width neutral surface region in the area between the normal line Lo and the normal line Li.

In FIG. 5, a point Pox is the point of intersection between the center line of the main portion 104 and the normal line Lo. A double-headed arrow Wo indicates the length from the point Po to the point Pox. Since the main portion 104 passes through the 30%-width neutral surface region, the ratio (Wo/Do) of the length Wo relative to the length Do is equal to or greater than 0.35 and equal to or less than 0.65.

In FIG. 5, a point Pix is the point of intersection between the center line of the main portion 104 and the normal line Li. A double-headed arrow Wi indicates the length from the point Pi to the point Pix. Since the main portion 104 passes through the 30%-width neutral surface region, the ratio (Wi/Di) of the length Wi relative to the length Di is equal to or greater than 0.35 and equal to or less than 0.65.

The following will describe advantageous effects of the present invention.

In the tire 62, the main portion 104 passes through the 30%-width neutral surface region. In the vicinity of the center, in the radial direction, of the apex 90 whose deformation is great, the main portion 104 passes through the vicinity of the center between the outer surface and the inner surface of the bead 70 portion. The main portion 104 passes through the vicinity of the neutral surface. Even when the bead 70 portion greatly deforms, a compressive force or tensile force applied to the main portion 104 is small. Occurrence of pinch cut in the main portion 104 is prevented. The tire 62 has excellent pinch cut resistance. Furthermore, since the compressive force or tensile force applied to the main portion 104 is reduced, separation of the cords of the main portion 104 from the rubber is suppressed even during run-flat running for a long period of time. The tire 62 has excellent run-flat durability.

As shown in FIG. 3, each side portion of the tire greatly bends during run-flat running. The vicinity of the bead is pressed against the rim flange. A great load is applied from the rim flange to a portion that is in contact with the rim flange, of the bead portion. Conventionally, each turned-up portion of the carcass ply is passed through the axially outer side of the apex. Each turned-up portion is passed through the rim flange side with respect to the apex. Because of the load from the rim flange, a great compressive force acts on each turned-up portion. Due to the compressive force, pinch cut occurs in the turned-up portion in some cases. Due to the compressive force, damage of the turned-up portion occurs during run-flat running for a long period of time.

In the tire 62 according to this embodiment, each apex 90 includes the first layer 92 and the second layer 94. Each turned-up portion 106 is passed between the first layer 92 and the second layer 94. At the axially inner side of the second layer 94, the turned-up portion 106 is curved toward the inner side. The turned-up portion 106 is curved in the direction away from the rim flange. Thus, a compressive force acting on the turned-up portion 106 is greatly alleviated. Occurrence of pinch cut in the turned-up portion 106 is prevented. Furthermore, since the compressive force applied to the turned-up portion 106 is reduced, occurrence of damage of the turned-up portion 106 is suppressed even during run-flat running for a long period of time. The tire 62 has excellent run-flat durability.

As shown in FIG. 5, the turned-up portion 106 is curved in the direction toward the inner surface of the side portion 84. A tensile force is applied to the turned-up portion 106. The turned-up portion 106 contributes to the stiffness of the bead 70 portion. Deformation of the bead 70 portion is suppressed. This suppresses occurrence of damage of the bead 70 portion even during run-flat running for a long period of time. The tire 62 has excellent run-flat durability.

In FIG. 4, a point PB is a point on the outer surface of the side portion 84. The point PB represents the radially outer edge of a contact surface between the side portion 84 and a rim when the tire 62 is mounted on the rim. The point PB is referred to as a separation point. A double-headed arrow TS indicates the thickness of the side portion 84 at the separation point PB. Specifically, the thickness TS is the length of a line that is drawn from the point PB to the inner surface of the side portion 84 and is normal to the inner surface of the side portion 84. A double-headed arrow TI indicates the maximum thickness of the load support layer 74. Specifically, the thickness TI is the maximum value of the distance between the inner surface and the outer surface of the load support layer 74 which distance is measured along a normal line that is drawn from the axially inner surface of the load support layer 74.

As described above, in the tire 62, since the run-flat durability is improved in the bead 70 portion, favorable run-flat durability can be achieved even when the thickness of the load support layer 74 is decreased. By appropriately adjusting the thickness TI, the vertical stiffness constant and the weight can be reduced while favorable run-flat durability is achieved. Accordingly, improvement of the ride comfort and reduction of the rolling resistance can be achieved.

In the tire 62, the ratio (TS/TI) of the thickness TS relative to the thickness TI is preferably equal to or greater than 1.5. By making the ratio (TS/TI) equal to or greater than 1.5, the vertical stiffness constant and the weight can be reduced. In the tire 62, improvement of the ride comfort and reduction of the rolling resistance are achieved. From this standpoint, the ratio (TS/TI) is more preferably equal to or greater than 1.6. The ratio (TS/TI) is preferably equal to or less than 2.0. By making the ratio (TS/TI) equal to or less than 2.0, the load support layer 74 has sufficient stiffness. The load support layer 74 is prevented from being damaged. In the tire 62, favorable run-flat durability is maintained. From this standpoint, the ratio (TS/TI) is more preferably equal to or less than 1.9.

In the tire 62, each side portion 84 preferably has a large number of dimples 86 or projections on the outer surface thereof. When the vehicle runs, turbulent flow is generated by these dimples 86 or projections. The turbulent flow promotes release of heat from the side portion 84. The temperature of the tire 62 is less likely to rise even during run-flat running. The tire 62 has excellent run-flat durability.

In FIG. 5, a solid line BBL represents a bead 70 base line. The bead 70 base line BBL corresponds to a line that defines the rim R diameter of the rim R (see JATMA) onto which the tire 62 is mounted. The bead 70 base line BBL extends in the axial direction. A double-headed arrow BH indicates the height in the radial direction from the bead 70 base line BBL to the end 110 of the apex 90. Reference character S represents a region in which the dimples 86 are arranged. A double-headed arrow DW indicates the width, in the radial direction, of the region S. In the case where the outer surface of each side portion 84 has projections, the region S represents a region in which the projections are arranged.

In the radial direction, the central position of the region S preferably coincides with the position of the end 110 of the apex 90. Here, the phrase "in the radial direction, the central position of the region S preferably coincides with the position of the end 110 of the apex 90" means that the ratio (SH/BH) of the height SH (not shown) from the bead 70 base line BBL to the central position of the region S relative to the height BH is equal to or greater than 0.95 and equal to or less than 1.05. During running, concentration of stress may occur in the vicinity of the end 110 of the apex 90 of the bead 70. In the vicinity of the end 110 of the apex 90 of the bead 70, heat generation is particularly likely to occur. By making the central position of the region S coincide with the position of the end 110 of the apex 90 in the radial direction, release of heat is effectively promoted in the tire 62. The tire 62 has excellent run-flat durability.

The ratio (DW/BH) of the width DW relative to the height BH is preferably equal to or greater than 0.3. By making the ratio (DW/BH) equal to or greater than 0.3, release of heat is effectively promoted in the tire 62. The tire 62 has excellent run-flat durability. From this standpoint, the ratio (DW/BH) is more preferably equal to or greater than 0.4. The ratio (DW/BH) is preferably equal to or less than 0.6. By making the ratio (DW/BH) equal to or less than 0.6, the dimples 86 or projections are less likely to become hindrances when the outer surface of the side portion 84 is designed. The tire 62 has a favorable degree of freedom in design.

EXAMPLES

Experiment 1

Example 1

A pneumatic tire (run flat tire) of Example 1 having the configuration shown in FIG. 1 and having specifications shown in Table 1 below was obtained. The size of the tire is 225/60RF18. In the tire, the height BL is 35 mm. The main portion of the carcass ply passes through the 20%-width neutral surface region. This is represented as "Yes" in the cell for 20%-width neutral surface region in Table 1. Regarding the main portion, the values of the ratio (Wo/Do) and the ratio (Wi/Di) are shown in Table 1. Since the main portion passes through the 20%-width neutral surface region, the main portion naturally also passes through the 30%-width neutral surface region. This is represented as "Yes" in the cell for 30%-width neutral surface region in Table 1. In the tire, the complex elastic moduli and the loss tangents at 140° C. of the apex and the load support layer are equal to each other.

Examples 2 to 5 and Comparative Examples 1 and 2

Tires of Examples 2 to 5 and Comparative Examples 1 and 2 were obtained by changing the ratio (Wo/Do) and the ratio (Wi/Di) to values as shown in Table 1. At this time, whether the main portion passes through the 20%-width neutral surface region and the 30%-width neutral surface region is as shown in Table 1. The tire of Comparative Example 1 is a conventional run flat tire. To change the ratio (Wo/Do) and the ratio (Wi/Di), the thickness of the reinforcing layer in the bead portion was changed. The thickness of the apex is maintained constant. In these tires, the others are the same as in the tire of Example 1.

[Pinch Cut Resistance]

Each tire was mounted onto a normal rim R (size=6.5 J) and attached to a commercially available front-wheel-drive passenger car. A punctured state was reproduced by setting the internal pressure of the tire to normal pressure. Baggage having a weight equivalent to the maximum load weight for the vehicle was loaded onto the vehicle to apply a load (6.8 kN) to the tire. A projection having a height of 200 mm was provided on the road surface of a test course, and the vehicle was caused to run such that the front wheel thereof moved over the projection. The tire was visually observed to check presence/absence of occurrence of damage by pinch cut. The vehicle was started at a speed of 40 km/h, then the speed was increased in steps of 10 km/h, and the speed at which damage of the tire occurred was measured. The results are shown in Table 1 below as index values with the value of Comparative Example 1 being defined as 100. The higher the value is, the less likely pinch cut is to occur. The higher the value is, the better the result is.

[Run-Flat Durability]

Each tire was mounted onto a normal rim (size=6.5 J) and attached to a commercially available front-wheel-drive passenger car. A punctured state was reproduced by setting the internal pressure of the tire to normal pressure. After the attachment, a vertical load corresponding to 65% of the maximum applied load specified in JATAM was applied to the tire. The vehicle was caused to run on a rotary drum of a running tester at a speed of 80 km/h, and the running distance until the tire became broken was measured. The results are shown in Table 1 below as index values with the value of Comparative Example 1 being defined as 100. The higher the value is, the better the result is. The higher the value is, the more excellent the tire is in run-flat durability.

[Tire Weight]

The weight of each tire was measured. The results are shown in Table 1 below as index values with the value of Comparative Example 1 being defined as 100. A lower value indicates a lower weight. The lower the value is, the better the result is.

[Vertical Stiffness Constant]

The vertical stiffness constant of the tire was measured under the following conditions.
Used rim: 6.5 J
Internal pressure: 200 kPa
Load: 5.0 kN The results are shown in Table 1 below as index values with the value of Comparative Example 1 being defined as 100. A lower value represents a lower vertical stiffness constant. The lower the value is, the better the result is.

TABLE 1

Results of Evaluation

|  | Comparative Example 1 | Example 2 | Example 3 | Example 1 | Example 4 | Example 5 | Comparative Example 2 |
|---|---|---|---|---|---|---|---|
| Ratio (Wo/Do) | 0.70 | 0.65 | 0.60 | 0.50 | 0.40 | 0.35 | 0.30 |
| Ratio (Wi/Di) | 0.70 | 0.65 | 0.60 | 0.50 | 0.40 | 0.35 | 0.30 |
| 30%-width neutral surface region | No | Yes | Yes | Yes | Yes | Yes | No |
| 20%-width neutral surface region | No | No | Yes | Yes | Yes | No | No |
| Weight | 100 | 100 | 101 | 101 | 102 | 103 | 105 |
| Vertical stiffness constant | 100 | 100 | 101 | 101 | 103 | 104 | 107 |
| Run-flat durability | 100 | 110 | 112 | 115 | 113 | 112 | 110 |
| Pinch cut resistance | 100 | 115 | 120 | 125 | 122 | 120 | 112 |

Experiment 2

Example 6

A pneumatic tire (run flat tire) of Example 6 having the configuration shown in FIG. 4 and having specifications shown in Table 2 below was obtained. However, in the tire, the outer surface of each side portion does not have any dimples 86 or projections. The size of the tire is 235/55RF18. In the tire, the height BH is 50 mm. In the tire, the ratio (Wo/Do) is 0.4, and the ratio (Wi/Di) is 0.5. The main portion passes through the 30%-width neutral surface region. In the tire, the complex elastic moduli and the loss tangents at 140° C. of the first layer, the second layer, and the load support layer are equal to each other.

Example 7

A tire of Example 7 was obtained in the same manner as in Example 6, except the apex was formed only by a single layer, and the thickness TI was changed such that the ratio (TS/TI) was as shown in Table 2. The thickness TI of the load support layer is equal to the thickness of the load support layer of a conventional tire.

Examples 8 to 11

Tires of Examples 8 to 11 were obtained in the same manner as in Example 6, except the thickness TI was changed such that the ratio (TS/TI) was as shown in Table 2.

Example 12

A tire of Example 12 was obtained in the same manner as in Example 6, except the outer peripheral surface of the side portion has a large number of dimples. In the tire, the central position of the region S and the position of the end of the apex coincide with each other in the radial direction.

Examples 13 to 17

Tires of Examples 13 to 17 were obtained in the same manner as in Example 12, except the width DW was changed such that the ratio (DW/BH) was as shown in Table 3.

[Run-Flat Durability]

Each tire was mounted onto a normal rim (size=7.5 J), and the run-flat durability was measured by the same method as in Experiment 1. The results are shown in Tables 2 and 3 below as index values with the value of Example 7 being defined as 100. The higher the value is, the better the result is. The higher the value is, the more excellent the tire is in run-flat durability.

[Tire Weight]

The weight of each tire was measured. The results are shown in Tables 2 and 3 below as index values with the value of Example 7 being defined as 100. A lower value indicates a lower weight. The lower the value is, the better the result is.

[Vertical Stiffness Constant]

The vertical stiffness constant of the tire was measured under the following conditions.
Used rim: 7.5 J
Internal pressure: 200 kPa
Load: 4.5 kN The results are shown in Tables 2 and 3 below as index values with the value of Example 7 being defined as 100. A lower value represents a lower vertical stiffness constant. The lower the value is, the better the result is.

[Rolling Resistance]

The rolling resistance was measured with a rolling resistance tester under the following measurement conditions.
Used rim: 7.5 J
Internal pressure: 200 kPa
Load: 4.5 kN
Speed: 90 km/h The results are shown in Tables 2 and 3 below as index values with the value of Example 7 being defined as 100. The lower the value is, the better the result is.

[Degree of Freedom in Design]

The degree of freedom in the design of the front-side side surface was categorized based on the following criteria.

A: Degree of freedom is high.
B: Degree of freedom is low.

The results are shown in Tables 2 and 3 below.

TABLE 2

Results of Evaluation

| | Example 7 | Example 8 | Example 9 | Example 6 | Example 10 | Example 11 |
|---|---|---|---|---|---|---|
| Apex structure | One layer | Two layers | Two layers | Two layers | Two layers | Two layers |
| Thickness TI | 110 | 110 | 103 | 90 | 78 | 74 |
| Thickness TS | 155 | 155 | 155 | 155 | 155 | 155 |
| Ratio (TS/TI) | 1.4 | 1.4 | 1.5 | 1.7 | 2.0 | 2.1 |
| Ratio (DW/BL) | — | — | — | — | — | — |
| 30%-width neutral surface region | Yes | Yes | Yes | Yes | Yes | Yes |
| Weight | 100 | 99 | 98 | 97 | 95 | 95 |
| Vertical stiffness constant | 100 | 98 | 96 | 95 | 94 | 94 |
| Rolling resistance | 100 | 99 | 99 | 97 | 97 | 97 |
| Run-flat durability | 100 | 110 | 128 | 130 | 128 | 110 |
| Degree of Freedom in Design | A | A | A | A | A | A |

TABLE 3

Results of Evaluation

| | Example 12 | Example 13 | Example 14 | Example 15 | Example 16 | Example 17 |
|---|---|---|---|---|---|---|
| Apex structure | Two layers | Two layers | Two layers | Two layers | Two layers | Two layers |
| Thickness TI | 90 | 90 | 90 | 90 | 90 | 90 |
| Thickness TS | 155 | 155 | 155 | 155 | 155 | 155 |
| Ratio (TS/TI) | 1.7 | 1.7 | 1.7 | 1.7 | 1.7 | 1.7 |
| Ratio (DW/BL) | 0.2 | 0.3 | 0.4 | 0.5 | 0.6 | 0.7 |
| 30%-width neutral surface region | Yes | Yes | Yes | Yes | Yes | Yes |
| Weight | 97 | 97 | 97 | 97 | 97 | 97 |
| Vertical stiffness constant | 95 | 95 | 95 | 95 | 95 | 95 |
| Rolling resistance | 97 | 97 | 97 | 97 | 97 | 97 |
| Run-flat durability | 131 | 134 | 137 | 140 | 145 | 150 |
| Degree of Freedom in Design | A | A | A | A | A | B |

As shown in Tables 1 to 3, the evaluation is higher in the tires of the examples than in the tires of the comparative examples. By making the thickness TS of the load support layer and the width DW of the region S to be appropriate values, further excellent results are obtained. From the results of evaluation, advantages of the present invention are clear.

The tire described above is applicable to various vehicles.

The above descriptions are merely illustrative examples, and various modifications can be made without departing from the principles of the present invention.

What is claimed is:

1. A pneumatic tire comprising:
a pair of side portions;
a pair of beads each located in a respective side portion;
a carcass extending on and between the one bead and the other bead;
a pair of run flat load support layers each located in the respective side portion and inward of the carcass in an axial direction;
an inner liner joined to the inner surfaces of the carcass and each run flat load support layer; and
a clinch in each side portion in cross-section which is located axially outward of the respective bead and the carcass;
wherein
each bead includes a core and an apex extending from the core outward in a radial direction,
the carcass includes a carcass ply;
the carcass ply is turned up around the core in each bead from an inner side toward an outer side in the axial direction, and
because of this turning-up, a main portion and turned-up portions are formed in the carcass ply, and in each side portion in cross-section, and
when:
a point that is located on an outer surface of the respective side portion and at which a distance from an outer edge of the core in the radial direction is 0.7 times of a distance from the outer edge of the core to an end of the apex in the radial direction is denoted as a point Po;
a line that is drawn from the point Po to an inner surface of the side portion and is normal to the inner surface of the side portion is denoted by Lo;
a point that is located on the outer surface of the side portion and at which the distance from the outer edge of the core in the radial direction is 0.3 times of the distance from the outer edge of the core to the end of the apex in the radial direction is denoted as a point Pi;
a line that is drawn from the point Pi to the inner surface of the side portion and is normal to the inner surface of the side portion is denoted by Li;
a point on the normal line Lo at which point a distance from the point Po is 35% of a length Do of the normal line Lo is denoted by $Po_{35}$;
a point on the normal line Lo at which point the distance from the point Po is 65% of the length Do is denoted by $Po_{65}$;
a point on the normal line Li at which point a distance from the point Pi is 35% of a length Di of the normal line Li is denoted by $Pi_{35}$; and
a point on the normal line Li at which point the distance from the point Pi is 65% of the length Di is denoted by $Pi_{65}$,
between the normal lines Lo and Li the center line of the main portion is included within a quadrilateral region having sides that are straight lines connecting the point $Po_{35}$, the point $Po_{65}$, the point $Pi_{35}$, and the point $Pi_{65}$, and
wherein in each side portion in cross-section throughout the area between the lines Lo and Li, the carcass ply turned-up portion contacts the clinch, the apex contacts the carcass ply turned-up portion, the carcass ply main portion contacts the apex, the run flat load support layer contacts the carcass ply main portion, and the inner liner contacts the run flat load support layer.

2. The pneumatic tire according to claim 1, wherein in each side portion in cross-section,
when: a point on the normal line Lo at which point the distance from the point Po is 40% of the length Do is denoted by $Po_{40}$;
a point on the normal line Lo at which point the distance from the point Po is 60% of the length Do is denoted by $Po_{60}$;
a point on the normal line Li at which point the distance from the point Pi is 40% of the length Di is denoted by $Pi_{40}$; and
a point on the normal line Li at which point the distance from the point Pi is 60% of the length Di is denoted by $Pi_{60}$,
between the normal lines Lo and Li the center line of the main portion is included within the quadrilateral region having sides that are straight lines connecting the point $Po_{40}$, the point $Po_{60}$, the point $Pi_{40}$, and the point $Pi_{60}$.

3. A wheel comprising:
the pneumatic tire according to claim 1 that is mounted on a normal rim having a pair of rim flanges forming the axially outer ends of the normal rim; wherein when the pneumatic tire is inflated to normal internal pressure but has no applied load, in each side portion in cross-section an outer end of the apex is disposed outward of an outer end of the edge of the rim flange in the radial direction.

* * * * *